United States Patent [19]

Omata et al.

[11] Patent Number: 5,127,813
[45] Date of Patent: Jul. 7, 1992

[54] MOLD FOR SKIN COVERED FOAMED PLASTIC MOLDING

[75] Inventors: Yoichi Omata; Norio Yanagishita, both of Ayase, Japan

[73] Assignee: Ikeda Bussan Co., Ltd., Kanagawa, Japan

[21] Appl. No.: 655,177

[22] Filed: Feb. 12, 1991

Related U.S. Application Data

[63] Continuation of Ser. No. 372,269, Jun. 27, 1989, abandoned.

[30] Foreign Application Priority Data

Jun. 28, 1988 [JP] Japan .................. 63-160185

[51] Int. Cl.$^5$ .................. B29C 39/04; B29C 39/10; B29C 39/26
[52] U.S. Cl. .................. 425/125; 249/65; 249/93; 249/160; 264/45.2; 264/46.6; 425/DIG. 112
[58] Field of Search .................. 249/65, 83, 95, 161, 249/93, 160; 264/46.6, 45.2, 46.7, 46.8; 425/117, 125, 390, DIG. 112

[56] References Cited

U.S. PATENT DOCUMENTS 4,017,572 4/1977 Magone et al. .................. 264/45.2
4,588,541 5/1986 Fowler .................. 264/45.2

FOREIGN PATENT DOCUMENTS 2027934 12/1971 Fed. Rep. of Germany ..... 264/45.2
61-280908 12/1986 Japan .

Primary Examiner—Jay H. Woo
Assistant Examiner—Khanh P. Nguyen
Attorney, Agent, or Firm—Weiser & Stapler

[57] ABSTRACT

A mold for molding a skin covered foamed plastic article capable of dealing with those foamed plastic articles having large curving portions without complicating the manufacturing process relating to the attachment of the skin member on the mold, without a leakage of liquid formed plastic to be poured over the mold. The mold includes a lower mold, over which a skin cover is to be placed, and on which liquid foamed plastic is to be poured onto the skin cover, the lower mold having: a fixed part on top of which the upper mold is to be placed; a movable part which makes contact with the fixed part at a lowered position at which there is a closed space between the fixed part and the movable part; and means for controlling air pressure inside the closed space between the fixed part and the movable part. A method of manufacturing a skin covered foamed plastic article using this mold is also disclosed.

3 Claims, 4 Drawing Sheets

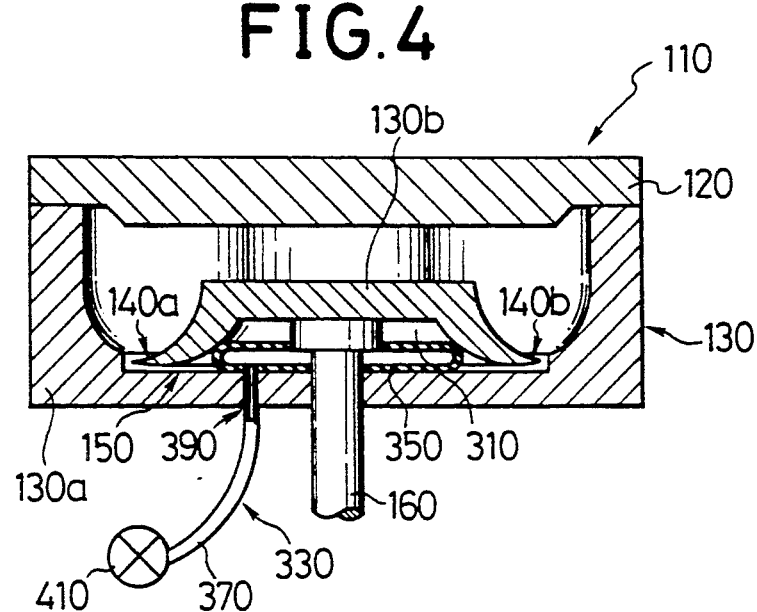
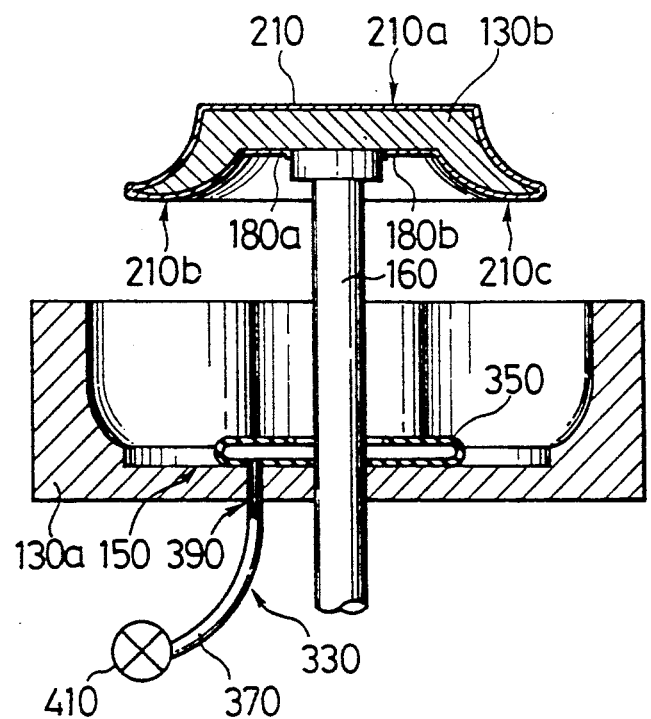

MOLD FOR SKIN COVERED FOAMED PLASTIC MOLDING

This application is a continuation, of application Ser. No. 07/372,269 filed Jun. 27, 1989 now abandoned.

BACKGROUND OF THE INVENTION

1. Field of the Invention

The present invention relates to a foamed plastic molding suitable for molding foamed plastic articles such as to be used for car seat cushions and seat backs in conjunction with skin covers.

2. Description of the Background Art

Car seat cushions and seat backs have been made of a pad member covered by a skin cover. The pad member and the skin cover used to be manufactured separately and combined together later, but it has become fashionable to manufacture a skin covered pad member altogether by forming foamed plastic in a skin cover laid over a mold, so that the process of combining at later time may be omitted.

However, the contemporary car seats tend to have large side support portions with large curving so that it becomes difficult to place the skin cover neatly over the mold. As a consequence, in order to obtain a skin covered pad member of desired shape it is necessary for a skin cover to be pinned down or taped to the mold, which is an additional complication in the manufacturing process.

One manner to cope with this situation has been disclosed by the present inventor in Japanese Patent Application (Laid Open) No. S61-280908.

Here, as shown in FIG. 1, there is provided a mold 11 comprising an upper mold 12 and a lower mold 13. The lower mold 13 further comprises a fixed part 13a with receiving edges 15a and 15b, and a movable part 13b movably supported by a supporting rod 16. Outer where outer edges 14a and 14b of the movable part 13b are caught by the receiving edges 15a and 15b at a lowered position.

In manufacturing a skin covered foamed plastic article, a skin member 21 is attached to the movable part 13b at a raised position with a middle portion 21a along an inner surface of the movable part 13b, and side portions 21b and 21c corresponding to the fixed part 13a rolled behind and fastened underneath the movable part 13b by means of pin members 18a and 18b, respectively, before lowering into a position in which the outer edges 14a and 14b of the movable part 13b are engaged with the receiving edges 15a and 15b of the fixed part 13a, as shown in FIG. 2. Then, liquid foamed plastic 26 is poured over the lower mold 13 from a nozzle 30 as in FIG. 2, and the upper mold 12 is placed over the lower mold 13 so as to form a foamed plastic pad member 25 of desired shape, automatically combined with the skin member 21, as in FIG. 3. This partially skin covered foamed plastic pad member 25 is then taken out from the mold 11, and the side portions 21b and 21c of the skin member 21 are rolled around the foamed plastic pad member 25 to make it fully covered.

However, in this manner of manufacturing the skin covered foamed plastic article has a problem of leakage of the liquid foamed plastic 26 through the engagements between the outer edges 14a and 14b of the movable part 13b and the receiving edges 15a and 15b of the fixed part 13a, especially when the skin member 21 is made of sheets of foamed material such as a slub-urethane. Such a leakage often results in producing an uncomfortable seat when the skin covered foamed plastic article is used for that purpose.

SUMMARY OF THE INVENTION

It is therefore an object of the present invention to provide a method and a mold for molding a skin covered foamed plastic article capable of dealing with those foamed plastic articles having large curving portions, without complicating the manufacturing process relating to the attachment of the skin member on the mold, and without a leakage of liquid foamed plastic to be poured over the mold.

According to one aspect of the present invention there is provided a mold for skin covered foamed plastic molding comprising an upper mold; a lower mold, over which a skin cover is to be placed, and on which liquid foamed plastic is to be poured onto the skin cover, the lower mold including: a fixed part on top of which the upper mold is to be placed, and a movable part which makes contact with the fixed part at a lowered position at which there is a closed space between the fixed part and the movable part; and means for controlling air pressure inside the closed space between the fixed part and the movable part.

According to another aspect of the present invention there is provided a method of skin covered foamed plastic molding, comprising the steps of raising a movable part of a lower mold above a fixed part of the lower mold; attaching a skin cover to the movable part with side portions corresponding to the fixed part rolled behind and fastened underneath the movable part; lowering the movable part to a lowered position at which the movable part makes a contact with the fixed part such that there is a closed space between the fixed part and the movable part; pouring liquid foamed plastic over the lower mold with skin cover attached; adjusting air pressure inside the closed space to a desired value; closing an upper mold over the lower mold until formation of a foamed plastic pad from the liquid foamed plastic is completed; removing the upper mold from the lower mold and taking the foamed plastic pad away from the lower mold; and completing a covering of the foamed plastic pad with the skin cover by attaching the side portions to the foamed plastic pad.

Other features and advantages of the present invention will become apparent from the following description taken in conjunction with the accompanying drawings.

BRIEF DESCRIPTION OF THE DRAWINGS

FIG. 4 is a cross sectional view of one embodiment of a mold for skin covered foamed plastic molding according to the present invention.

FIG. 5 is another cross sectional view of the mold for skin covered foamed plastic molding of FIG. 4 for explaining the manufacturing process with this mold.

DETAILED DESCRIPTION OF THE PREFERRED EMBODIMENT

Figure 1:
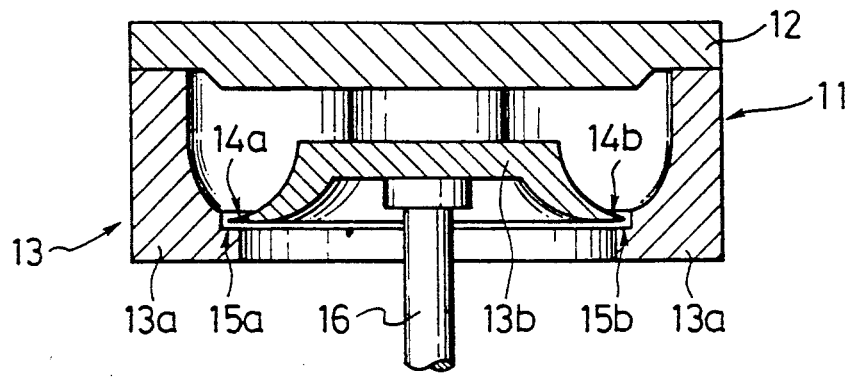
FIG. 1 is a cross sectional view of a conventional mold for skin covered foamed plastic molding.
Figure 2:
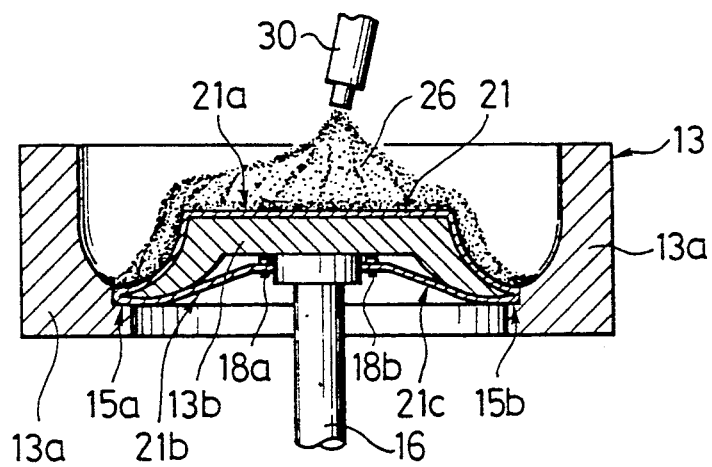
FIG. 2 is another cross sectional view of the conventional mold of FIG. 1 for explaining the manufacturing process with this mold.
Figure 3:
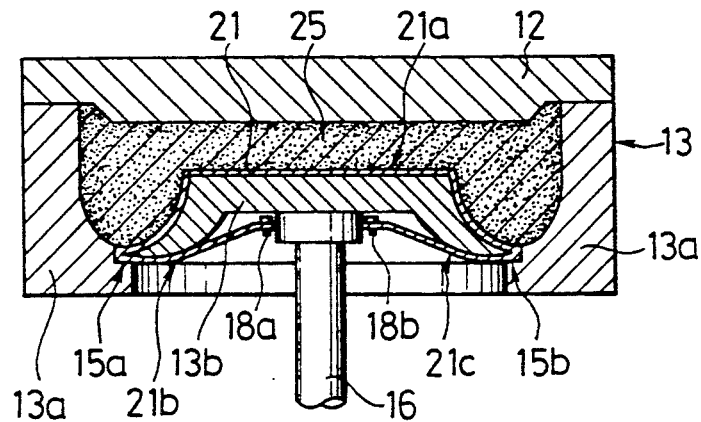
FIG. 3 is another cross sectional view of the conventional mold of FIG. 1 for explaining the manufacturing process with this mold.

Referring now to FIG. 4, there is shown one embodiment of a mold for skin covered foamed plastic molding according to the present invention.

This mold for skin covered foamed plastic molding 110 comprises an upper mold 120 and a lower mold 130. The lower mold 130 further comprises a U-shaped fixed part 130a with receiving portion 150, and a movable part 130b movably supported by a supporting rod 160, where outer edges 140a and 140b of the movable part 130a are caught by the receiving portion 150 of the fixed part 130a at a lowered position. There is also provided a pressure control device 330 comprising an air bag 350 on the receiving portion 150 connected to an air pump 410 outside the mold 110 by an air pipe 370 passing through a hole 390 in the receiving portion 150. Thus, when the movable part 130b is at the lowered position in which the outer edges 140a and 140b of the movable part 130b touch the receiving portion 150 of the fixed part 130a, there is a closed space 310 between the back of the movable part 130b and the receiving part 150, and the pressure inside this closed space 310 can be changed by supplying air from the air pump 410 to the air bag 350.

In manufacturing a skin covered foamed plastic article, a skin member 210 is attached to the movable part 130b at a raised position with a middle portion 210a along an inner surface of the movable part 130b, and side portions 210b and 210c corresponding to the fixed part 130a rolled behind and fastened underneath the movable part 130b by means of pin members 180a and 180b, respectively, before lowering into a position in which the outer edges 140a and 140b of the movable part 130b are engaged with the receiving portion 150 of the fixed part 130a, as shown in FIG. 5.

Figure 6:
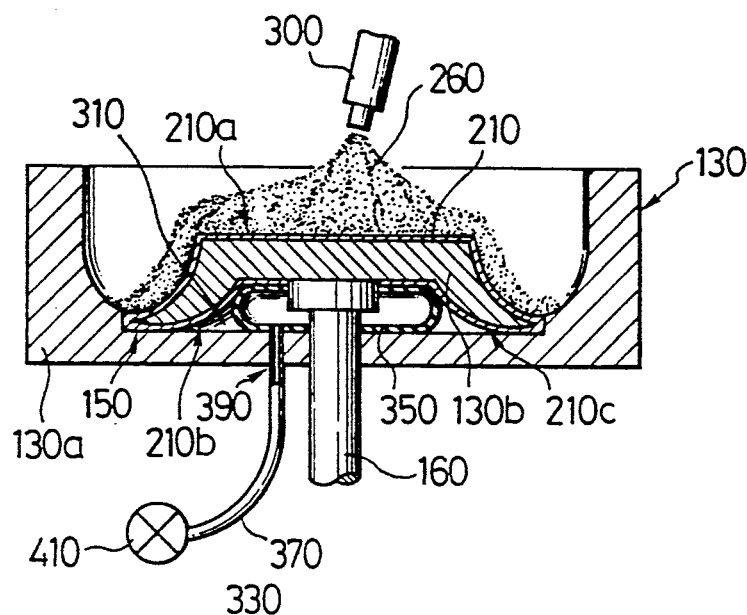
FIG. 6 is another cross sectional view of the mold for skin covered foamed plastic molding of FIG. 4 for explaining the manufacturing process with this mold.
Figure 7:
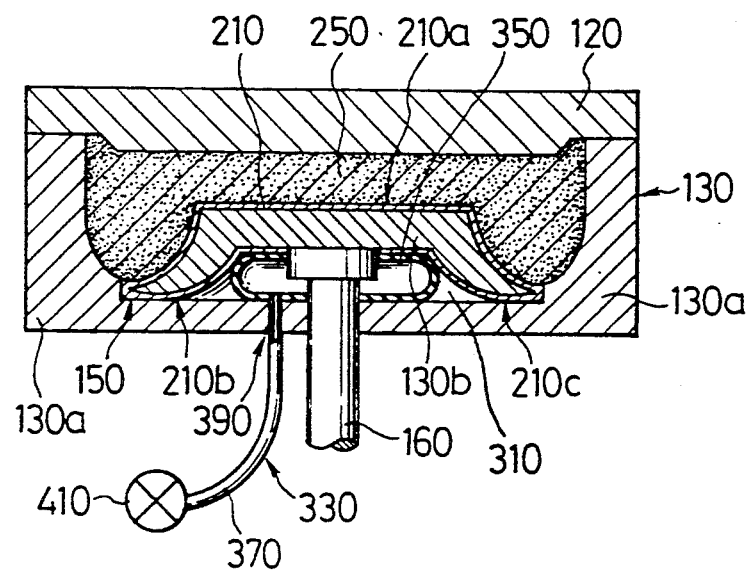
FIG. 7 is another cross sectional view of the mold for skin covered foamed plastic molding of FIG. 4 for explaining the manufacturing process with this mold.

Then, the pressure inside the closed space 310 is controlled by supplying air from the air pump 410 to the air bag 350, liquid foamed plastic 260 is poured over the lower mold 130 from a nozzle 300 as in FIG. 6, and the upper mold 120 is placed over the lower mold 130 so as to form a foamed plastic pad member 250 of desired shape, automatically combined with the skin member 210, as in FIG. 7. Here, when the pressure inside the closed space 310 is raised, the leakage of the liquid foamed plastic 260 can be reduced, because the amount of gases leaking through the outer edges 140a and 140b into the closed space 310 will then be decreased.

Figure 8:
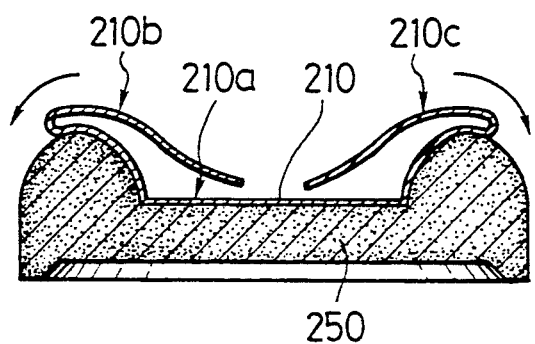
FIG. 8 is a cross sectional view of a skin covered foamed plastic article manufactured by the mold for skin covered foamed plastic molding of FIG. 4 for explaining the manufacturing process with this mold.
Figure 9:
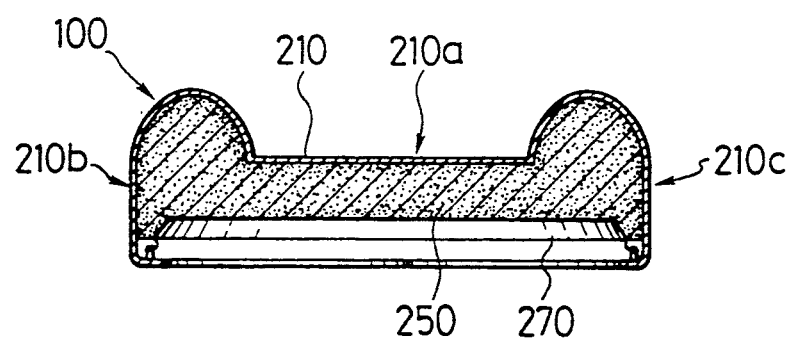
FIG. 9 is another cross sectional view of the skin covered foamed plastic article of FIG. 8 for explaining the manufacturing process with this mold.

After the formation of the foamed plastic pad member 250 is completed, the upper mold 210 is removed, the movable portion 130b is lifted to the raised position, and the partially skin covered foamed plastic pad member 250 is then taken away from the mold 110, as in FIG. 8. Finally, this partially skin covered foamed plastic pad member 250 is placed over a seat frame 270 and the side portions 210b and 210c of the skin member 210 are rolled around the foamed plastic pad member 250 and pinned back or glued, to make a fully skin covered foamed plastic seat 100. The air in the air bag 350 may be released any time after the completion of the formation of the foamed plastic pad member 250.

Thus, according to this embodiment, it is posible to provide a mold for molding a skin covered foamed plastic article capable of dealing with those foamed plastic articles having large curving portions without complicating the manufacturing process relating to the attachment of the skin member on the mold, as the attachment of the skin member 210 is carried out with the movable part 130b at the raised position and the side portions 210a and 210b of the skin member 210 are attached after the completion of the formation of the foamed plastic pad member 250.

Furthermore, this mold 110 can be made free of a leakage of liquid foamed plastic 260, by suitably adjusting the pressure inside the closed space 310 by means of the pressure control device 330.

It is to be noted that in this embodiment the leakage of the liquid foamed plastic is actually controllable so that the leakage may be increased by lowering the pressure inside the closed space, if desired.

It is also to be noted that the fixed part 130a and the movable part 130b in the above embodiment may be switched such that the middle portion of the lower mold 130 stays fixed instead. Also, the shape of the closed space 310 in the above embodiment is variable. Moreover, the pressure control inside the closed space 310 using the air bag 350 in the above embodiment may be replaced by pressure control by the air pump 410 performed directly on the closed space 310.

Besides these, many modifications and variations of the above embodiment may be made without departing from the novel and advantageous features of the present invention. Accordingly, all such modifications and variations are intended to be included within the scope of the appended claims.

What is claimed is:

1. A mold for skin covered foamed plastic molding, comprising:
    an upper mold;
    a lower mold for forming a molding cavity in conjunction with the upper mold, for receiving a skin cover placed in the molding cavity, and liquid foamed plastic poured onto the skin cover, the lower mold including:
    a fixed part to which the upper mold is assembled, having an inner side wall defining a part of the molding cavity and an inner bottom wall;
    a movable part located inside the fixed part, having a front side defining a part of the molding cavity and a back side, and which makes contact with the fixed part at a lowered position, forming a closed space separated from the molding cavity and defined between the fixed part and the movable part by the back side of the movable part and the inner bottom wall of the fixed part; and
    means for controlling air pressure inside the closed space between the fixed part and the movable part.

2. The mold of claim 1, wherein the fixed part has a receiving portion which makes contact with edges of the movable part when the movable part is in the lowered position, wherein the skin cover is attached only to the movable part by rolling side portions of the skin cover over the front side of the movable part and around the edges of the movable part, and means for fastening edge portions of the skin cover to the back side of the movable part.

3. The mold of claim 2, wherein the controlling means includes:
   an air bag placed on the inner bottom wall of the fixed part underneath the movable part, which is located inside the closed space when the movable part is in the lowered position; and
   air pump means for supplying air into the air bag.

* * * * *